US010654169B2

(12) United States Patent
Oowatari

(10) Patent No.: US 10,654,169 B2
(45) Date of Patent: May 19, 2020

(54) SUPPLY DEVICE CONFIGURED TO CIRCULATE WORKPIECES AND TRANSPORT DEVICE EQUIPPED WITH SUPPLY DEVICE

(71) Applicant: FANUC Corporation, Yamanashi (JP)

(72) Inventor: Hiroshi Oowatari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 133 days.

(21) Appl. No.: 16/033,535

(22) Filed: Jul. 12, 2018

(65) Prior Publication Data

US 2019/0022869 A1 Jan. 24, 2019

(30) Foreign Application Priority Data

Jul. 19, 2017 (JP) ................... 2017-140213

(51) Int. Cl.
| B25J 9/00 | (2006.01) |
| B25J 9/16 | (2006.01) |
| B65G 47/14 | (2006.01) |
| B65G 47/52 | (2006.01) |
| B65G 47/80 | (2006.01) |

(52) U.S. Cl.
CPC ........... B25J 9/1697 (2013.01); B25J 9/0093 (2013.01); B25J 9/0096 (2013.01); B65G 47/1428 (2013.01); B65G 47/52 (2013.01); B65G 47/80 (2013.01)

(58) Field of Classification Search
CPC ...... B25J 9/0093; B25J 9/0096; B25J 9/1697; B65G 47/1428; B65G 47/52; B65G 47/80; B65G 47/905
See application file for complete search history.

(56) References Cited

U.S. PATENT DOCUMENTS

| 2006/0269384 A1* | 11/2006 | Kiaie | B25J 9/0096 |
| | | | 414/222.02 |
| 2010/0063629 A1* | 3/2010 | Battisti | B25J 9/1679 |
| | | | 700/259 |
| 2017/0349385 A1* | 12/2017 | Moroni | B65G 47/96 |
| 2017/0369244 A1* | 12/2017 | Battles | B65G 1/137 |
| 2019/0023501 A1* | 1/2019 | Oowatari | B25J 9/1687 |
| 2019/0031451 A1* | 1/2019 | Morino | G06T 7/0004 |
| 2019/0225423 A1* | 7/2019 | Leow | B65G 1/045 |

FOREIGN PATENT DOCUMENTS

| JP | S47-37381 A | 12/1972 |
| JP | H6-115667 A | 4/1994 |
| JP | H8-323669 A | 12/1996 |
| JP | 2006-82186 A | 3/2006 |
| JP | 2013-75767 A | 4/2013 |
| JP | 2015-218047 A | 12/2015 |
| JP | 2017-19623 A | 1/2017 |

* cited by examiner

*Primary Examiner* — Robert T Nguyen
(74) *Attorney, Agent, or Firm* — Hauptman Ham, LLP

(57) ABSTRACT

The supply device includes a rotating table. The supply device includes a plate-shaped member configured to move bolts placed on the table and a plate-shaped member configured to discharge bolts to the outside of the table. A replenishment region to which bolts are replenished is set in a first rotation region of the table. A discharge region from which the bolts are discharged is defined in a second rotation region. The plate-shaped member is configured to move bolts from the first rotation region to the second rotation region.

5 Claims, 9 Drawing Sheets

SUPPLY DEVICE CONFIGURED TO CIRCULATE WORKPIECES AND TRANSPORT DEVICE EQUIPPED WITH SUPPLY DEVICE

RELATED APPLICATIONS

The present application claims priority of Japanese Application Number 2017-140213, filed on Jul. 19, 2017, the disclosure of which is hereby incorporated by reference herein in its entirety.

BACKGROUND OF THE INVENTION

1. Field of the Invention

The present invention relates to a supply device configured to circulate a workpiece and a transport device equipped with the supply device.

2. Description of the Related Art

In factories or the like where products are manufactured, there are processes for moving workpieces and processes for attaching workpieces to predetermined members, or the like. It is known that the transport of such workpieces can be performed by using a device such as robot or the like.

When workpieces are transported to factories or the like, there are cases where a large number of workpieces are stored in containers such as bags or boxes. For example, small parts such as electronic components and bolts are stored in containers without being organized. In short, small parts are stored in containers in a bulk state. Since the workpieces vary in orientation, there are cases where it can be difficult to take out workpieces by a take-out device such as a robot or the like. For this reason, in order to make it easier for the take-out device to take out workpieces, the supply device configured to supply workpieces to take-out device in a state in which the workpieces do not overlap with each other is known.

As the supply device, the device configured to supply workpieces to a robot after arranging workpieces that were inserted in a bulk state into rows (e.g., JP 06-115667) is known. Alternatively, the supply device is known configured to supply workpieces to a robot after sorting the workpieces based on the type of each workpiece or adjusting the orientation of the workpieces, during transportation of the workpieces (e.g., JP 08-323669 A and JP 2017-19623 A).

SUMMARY OF INVENTION

A device for placing a workpiece on an upper surface of a table and rotating the table is known as the supply device configured to supply workpieces to the robot or the like. The workpiece circulates in accordance with the rotation of the table. The robot can take out the workpiece that moves when the table rotates.

However, with respect to workpieces that have a front side and a back side, when it is predetermined that a robot grips a particular surface, there are cases where workpieces cannot be taken out. Alternatively, when a plurality of workpieces are in contact with each other or overlap with each other on a table, there are cases where workpieces cannot be taken out. Even when such workpieces are circulated, the robot cannot take out them. In contrast, workpieces are replenished to the table from hoppers or the like. As a result, as time passes, the number of the workpieces that the robot cannot take out continues to increase on the table.

Accordingly, the supply device configured to supply the workpieces can be provided with a mechanism for discharging workpieces from the table after one rotation of a workpiece. Workpieces discharged from the table can be collected by a collection device. Workpieces can be replenished on the table again by the collection device. However, there are cases where workpieces are damaged during the period when workpieces are being transported by the collection device. In this case, a problem arises in which these workpieces become defective products, and cannot be used in subsequent processes. For this reason, it is preferable that the number of workpieces collected by the collection device is few.

In contrast, among the workpieces that are discharged, there are also workpieces which could be taken out by the robot in a case where they were circulated another time. These workpieces are also discharged after one rotation. For this reason, there is a problem that the efficiency of supplying workpieces is low. In addition, in the table, the number of workpieces becomes large in the region where workpieces are replenished, and the number of workpieces becomes few in regions other than the region to which workpieces are replenished. There is a problem in which the entire surface of the table cannot be effectively used, and the efficiency of supplying workpieces is poor. In other words, there is a problem that the supply device of the related art cannot supply a large number of workpieces in a state in which they may easily be taken out.

One aspect of the present disclosure relates to a supply device configured to supply a workpiece to a take-out device configured to take out the workpiece. The supply device includes a placement member on which the workpiece is placed and a drive motor configured to rotate the placement member. The supply device includes a movement member configured to move the workpiece placed on the placement member and a discharge member configured to discharge the workpiece to the outside of the placement member. A plurality of rotation regions are predetermined on the surface of the placement member in a concentric shape around the rotational axis of the placement member. A replenishment region in which the workpiece is replenished is set in one rotation region of an innermost rotation region and an outermost rotation region, and a discharge region in which the discharge member is disposed is set in the other rotation region. The movement member is configured to move the workpiece to an adjacent rotation region in a direction from the rotation region in which the replenishment region is set to the rotation region in which the discharge region is set.

Another aspect of the present disclosure relates to a transport device including the above-described supply device and a take-out device configured to take out the workpiece placed on a placement member. The transport device includes an imaging device configured to image the workpiece placed on the placement member and a control device configured to control the take-out device and the imaging device. A detection region in which the workpiece is imaged by the imaging device and a gripping region in which the workpiece is gripped by the take-out device are predetermined in the region where the placement member is disposed. At least a portion of the detection region is disposed downstream of the replenishment region in a direction in which the placement member rotates. The detection region is disposed upstream from the gripping region. The control device is configured to detect the position and orientation of the workpiece based on an image of the workpiece captured by the imaging device. The control device calculates the position and orientation of the workpiece in the gripping region based on the position and orientation of the workpiece in the detection region and a rotation angle of the placement member. The control device controls the take-out device so as to grip the workpiece based on a position and orientation of the workpiece in the gripping region.

BRIEF DESCRIPTION. OF THE DRAWINGS

DETAILED DESCRIPTION

A supply device and a transport device that includes the supply device according to an embodiment will be described with reference to FIG. 1 to FIG. 9. The supply device of the present embodiment supplies a workpiece to a take-out device. In the transport device of the present embodiment, the take out device changes the orientation of the workpiece, and arranges it at a predetermined position.

Figure 1:
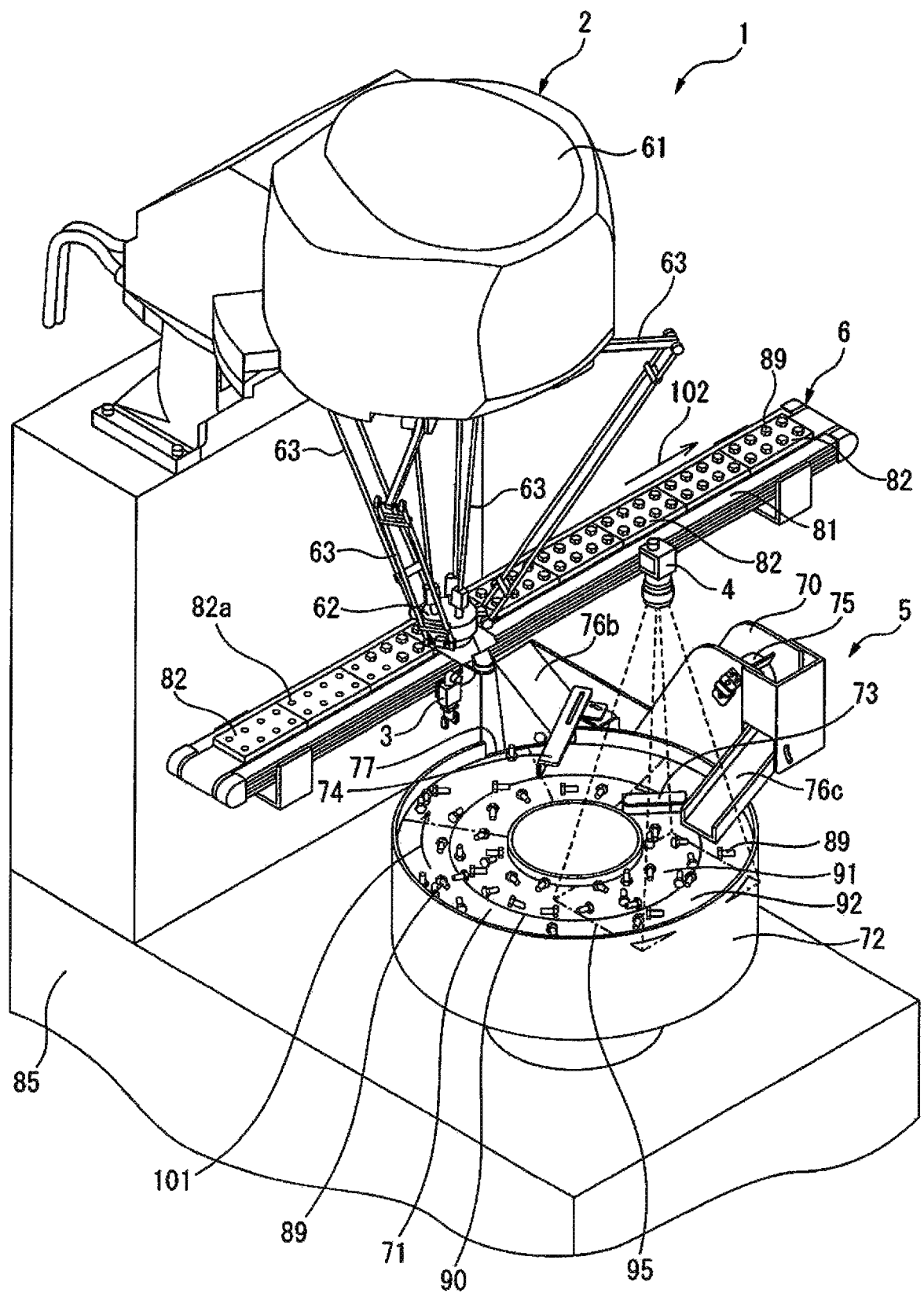
FIG. 1 is a perspective view of a transport device according to an embodiment.

FIG. 1 illustrates a perspective view of a transport device according to the present embodiment. In the present embodiment, a bolt 89 will be described as an example of a workpiece that is taken out by the take-out device. The transport device 1 includes a robot 2 serving as the take-out device configured to take out the bolt 89 from the supply device 5. The transport device 1 includes a supply device 5 for supplying the bolt 89 to the robot 2. The transport device 1 includes an export device 6 for exporting the bolt 89 taken out by the robot 2. The robot 2, the supply device 5, and the export device 6 are supported by a mount 85.

The supply device 5 of the present embodiment includes a table 71 serving as a placement member on which the bolt 89 is placed. In the table 71 of the present embodiment, the shape of the plane is formed in a substantially circular shape. The supply device 5 includes a table drive motor for rotating the table 71. The table 71 is rotated in the direction indicated by the arrow 101 by the table drive motor. The table drive motor can rotate the table 71 at a constant rotation speed, for example. The placement surface of the table 71, on which the bolt 89 is placed, is formed in a planar shape. In addition, the placement surface is formed so as to extend in the horizontal direction. The table 71 and the table drive motor are supported by the frame body 72.

The robot 2 of the present embodiment is a parallel link robot. The robot 2 takes out a bolt 89 that is placed on the table 71 and circulates. The robot 2 includes a plurality of links 63 and a base portion 61 that supports the plurality of links 63. The robot 2 includes a movable plate 62 supported by the plurality of links 63. The movable plate 62 is disposed at the tips of the plurality of links 63. Robot drive motors for driving the respective links 63 are disposed inside the base portion 61. The robot 2 is formed such that the position and orientation of the movable plate 62 can be changed by driving the plurality of links 63. In short, the position and orientation of the robot 2 change when the robot drive motors are driven.

A hand 3 serving as a work tool is coupled to the movable plate 62. The hand 3 of the present embodiment includes a pair of finger portions that operate by pneumatic pressure. By closing the finger portions together, a bolt 89 can be gripped. Also, by opening the fingers together, the bolt 89 can be released. The work tool is not limited to this embodiment, and any device that is capable of gripping or releasing the workpiece can be utilized. For example, the work tool may be formed so as to grip the workpiece by suction.

The export device 6 of the present embodiment may be disposed within the range that the hand 3 can reach. The export device 6 includes a pallet 82 for placing the bolts 89 and a conveyor 81 for moving the pallet 82. In the pallet 82, a hole 82a that extends in the vertical direction is formed. The robot 2 moves the bolt 89 such that the screw portion of the bolt 89 is inserted into the hole 82a. Bolts 89 are disposed in each respective hole 82a. The pallet 82 on which the bolts 89 are disposed is transported by the conveyor 81 in the direction indicated by the arrow 102.

The transport device 1 includes an imaging device configured to capture images of the bolt 89 placed on the table 71. The imaging device of the present embodiment includes a camera 1 supported by a support member (not illustrated in the drawings). Based on the image captured by the camera 4, the position and orientation of the bolt 89 are detected. The camera 4 of the present embodiment is a two dimensional camera. The camera 4 is not limited to a two dimensional camera, and any camera that is capable of detecting the position and orientation of the workpiece placed on the table can be utilized. For example, the imaging device may include a three-dimensional camera.

Figure 2:
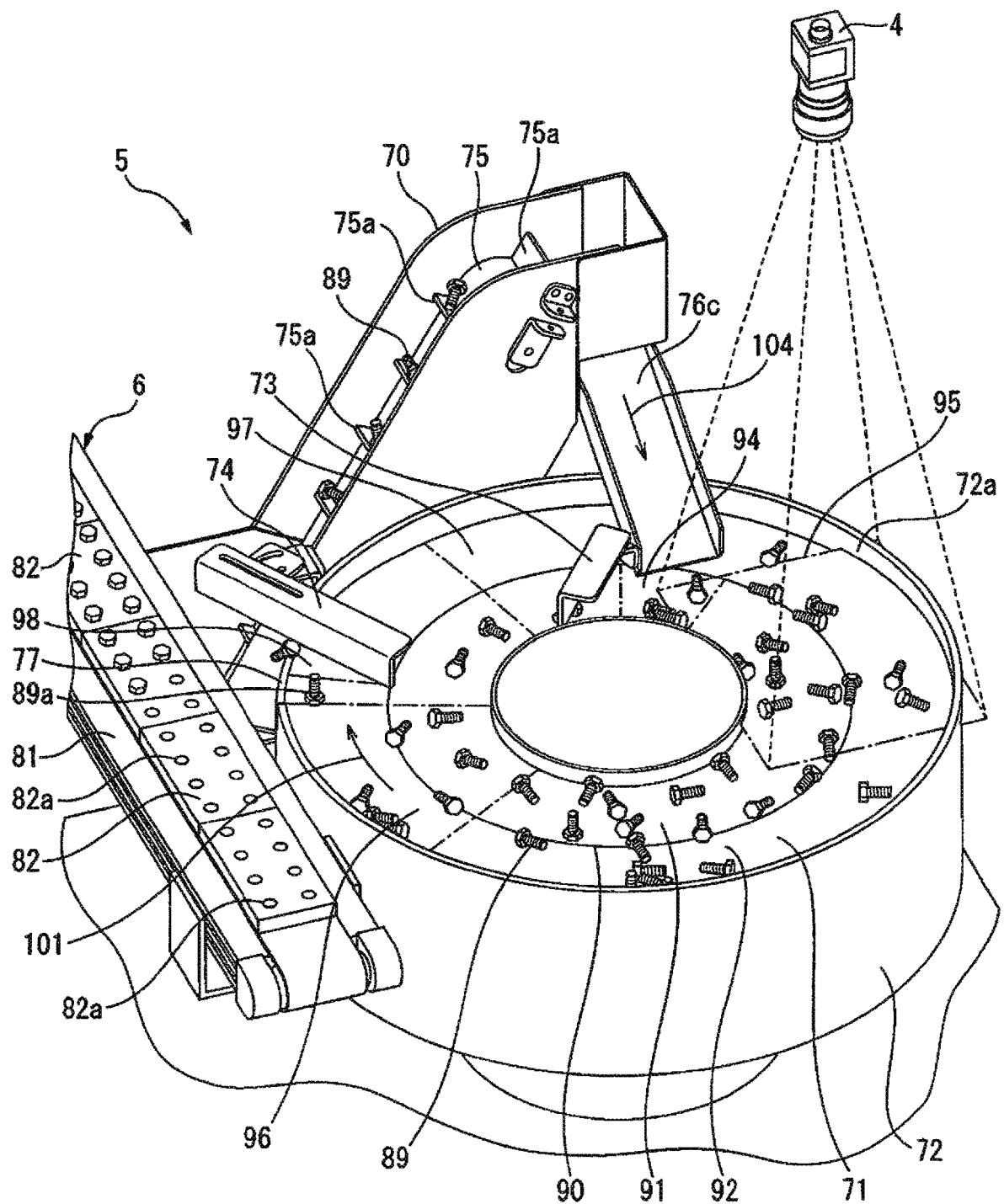
FIG. 2 is an enlarged perspective view of a supply device according to the embodiment.
Figure 3:
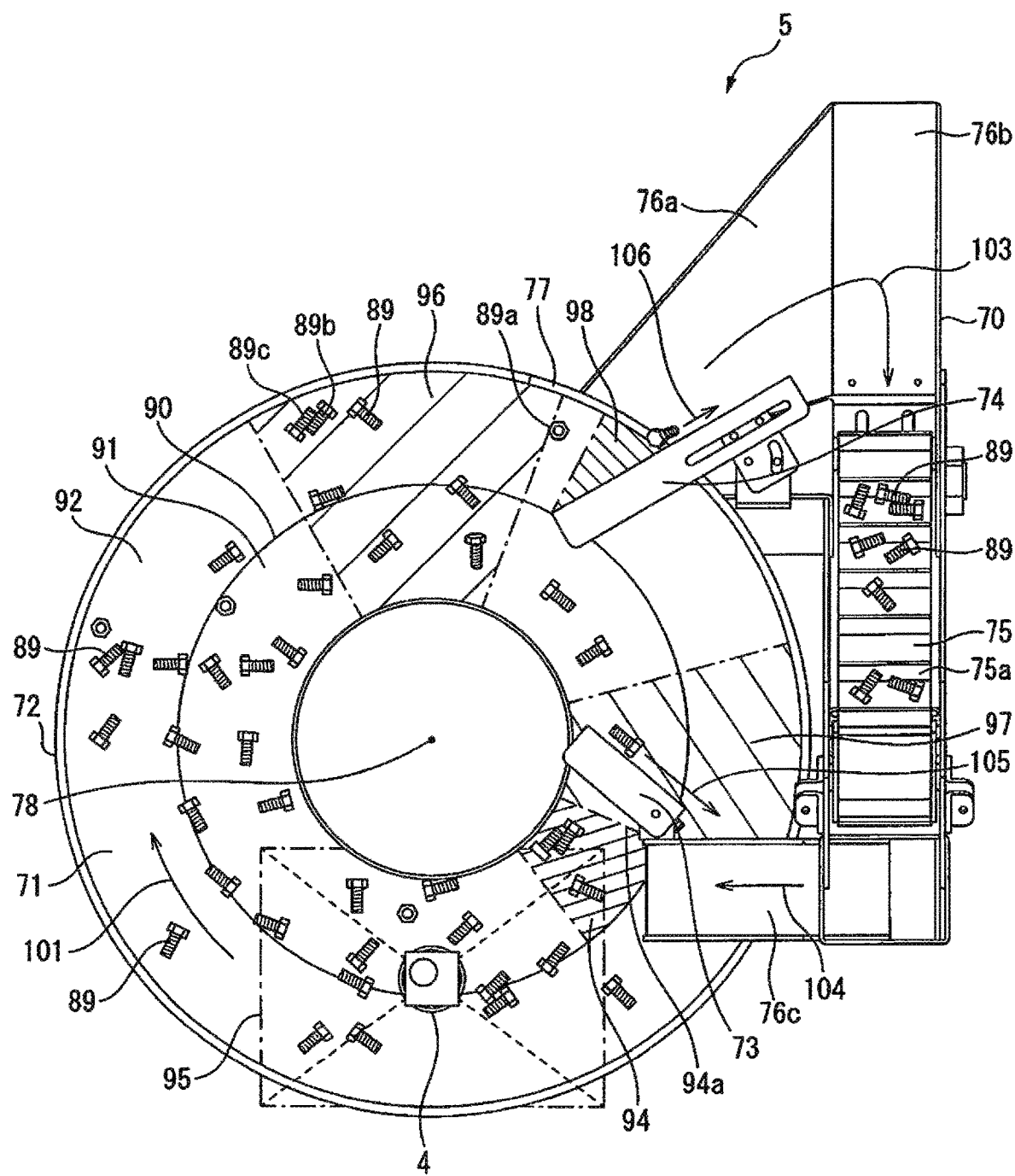
FIG. 3 is an enlarged plan view of the supply device according to the embodiment.

FIG. 2 illustrates an enlarged perspective view of a supply device according to the present embodiment. FIG. 3 illustrates an enlarged plan view of the supply device according to the present embodiment. With reference to FIG. 1 to FIG. 3, on the surface of the table 71, a plurality of rotation regions for disposing the bolts 89 are defined in a concentric shape around the rotation axis 78 of the table 71. In the present embodiment, two rotation regions 91 and 92 are set. The rotation regions 91 and 92 are bounded by a boundary line 90. Each of the rotation regions 91 and 92 are formed in an annular shape.

The first rotation region 91 is the region inside the boundary line 90. The second rotation region 92 is the region outside the boundary line 90. It should be noted that, in FIG. 1 to FIG. 3, although the boundary line 90 is marked on the surface of the table 71 for the purpose of explaining the rotation regions 91 and 92, the boundary line 90 need not be marked thereon.

The supply device 5 includes a frame body 72 surrounding the table 71. The frame body 72 includes a wall portion 72a surrounding the table 71 such that the bolt 89 does not fall from the table 71. The frame body 72 includes a notch portion 77 in which a part of the wall portion 72a is cut out. The notch portion 77 functions as a discharge part from which the bolts 89 are discharged from the table 71.

The supply device 5 includes a plate-like member 73 serving as a movement member for moving the bolt 89 placed on the table 71. The plate-like member 73 is supported by a guide member 76c of the collection device 70. The plate-like member 73 does not move when the table 71 rotates. The plate-like member 73 moves the bolt 89 in the radial direction of the table 71. The plate-like member 73 is arranged in the first rotation region 91. The plate-like member 73 is formed so as to extend over the entire width of the first rotation region 91. The plate-like member moves the bolt 89 from the first rotation region 91 to the second rotation region 92. When the table 71 rotates in the direction indicated by the arrow 101, the bolts 89 move together with the rotation of the table 71. The bolt 89 that comes in contact with the plate-like member 73 moves in the direction indicated by the arrow 105. Then, the bolt 89 moves to the second rotation region 92.

The plate-like member 73 is inclined with respect to the radial direction of the table 71, when viewed in a plan view such that the workpiece placed on one rotation region is moved to an adjacent rotation region. The plate-like member 73 is disposed such that the radial outer end portion is disposed on the downstream side from the radial inner end portion. The plate-like member 73 moves the bolts 89 from one rotation region toward another rotation region arranged outside the one rotation region. The plate-like member 73 is configured to move all of the bolts 89 that flow in to another rotation region.

The supply device 5 includes a plate-like member 74 as a discharge member for discharging the bolts 89 to the outside of the table 71. The plate-like member 74 is supported by the frame body 72. The plate-like member 74 is stationary when the table 71 rotates. The plate like member 74 is disposed in the second rotation region 92. The plate-like member 74 is disposed in the region where the notch portion 77 is formed. The plate-like member 74 is configured to move the bolts 89 from the outermost second rotation region 92 to the outside of the table 71. The plate-like member 74 is inclined with respect to the radial direction of the table 71 when viewed in a plan view.

When the bolts 89 placed in the second rotation region 92 come into contact with the plate like member 74, they are discharged from the notch portion 77 of the frame body 72 as indicated by the arrow 106. The plate-like member 73 is configured to discharge all the bolts 89 flowing in the second rotation region 92.

The supply device 5 includes collection device 70 configured to collect the bolts 89 discharged to the outside of the table 71. The collection device 70 includes a guide member 76a configured to receive the bolts 89 that fall from the notch portion 77 of the frame body 72. The guide member 76a functions as a collection part that collects the workpieces discharged from the table 71. The collection device 70 includes a guide member 76b that guides the bolts 89 received by the guide member 76a to a conveyor 75.

The collection device 70 includes a conveyor 75 for transporting the collected bolts 89 to a high position. The conveyor 75 includes crosspieces 75a for seizing the bolts 89. The crosspieces 75a are formed at predetermined intervals. The bolt 89 transported by the conveyor 75 is replenished to the surface of the table 71 by the guide member 76c. The guide member 76c functions as a replenishment part for replenishing the bolts 89 to the innermost first rotation region 91.

The bolts 89 discharged from the notch portion 77 by the plate-like member 74 are supplied to an import port of the conveyor 75 via the guide members 76a and 76b as indicated by the arrow 103. After being transported to a high position by the conveyor 75, the bolts 89 are then supplied to the guide member 76c. The bolts 89 are supplied to the table 71 via the guide member 76c as indicated by the arrow 104. In this way, the bolts 89 that have not been taken out by the robot 2 are collected by the collection device 70, and subsequently supplied to the surface of the table 71.

It should be noted that the bolts 89 are added to the collect on device 70 in accordance with the operation of the robot 2 that takes out the bolts 89. In the present embodiment, the bolts 89 to be added are dropped in the guide member 76b. The replenished bolts 89 are replenished to the first rotation region 91 together with the collected bolts 89.

A replenishment region 91 to which bolts 89 are replenished is preset in the region in which the table 71 is arranged. The replenishment region 94 is set so as to correspond to the position where the bolts 89 are replenished from the collection device 70. The replenishment region 94 is set inside the innermost first rotation region 91. Here, in the present embodiment, the direction indicated by the arrow 101 in which the table 71 rotates with reference to the start line 94a of the replenishment region 94 is referred to as downstream. The bolt 89 moves downstream.

In addition, a detection region 95 for imaging the bolts 89 by the camera 4 is preset in the area where the table 71 is arranged. At least a portion of the detection region 95 is set downstream from the replenishment region 94. The detection region 95 can be set such that the entire radial direction of the table 71 may be imaged. The detection region 95 of the present embodiment is set in the first rotation region 91 and the second rotation region 92.

A gripping region 96 in which bolts 89 are gripped by the robot 2 is set in the region where the table 71 is arranged. The gripping region 96 is set downstream from the detection region 95. That is, the detection region. 95 is disposed upstream from the gripping region 96. The gripping region 96 of the present embodiment is set in the first rotation region 91 and the second rotation region 92.

A discharge region 98 from which the bolts 89 are discharged is set in the region where the table 71 is arranged. The discharge region 98 is set so as to correspond to the position of the plate-like member 74 that serves as the discharge member. The discharge region 98 is disposed downstream from the gripping region 96. The discharge region 98 is set in the second rotation region 92.

Further, a movement region 97 for moving the bolt 89 placed on one rotation region to an adjacent rotation region is set in the region where the table 71 is arranged. The movement region 97 is disposed downstream from the grip tag region 96 and the discharge region 98. The movement region 97 is set so as to correspond to the position of the plate member 73 that serves as the movement member. In the present embodiment, in the movement region 97, all the bolts 89 arranged in the first rotation region 91 are moved to the second rotation region 92.

It should be noted that the replenishment region 94, the detection region 95, the gripping region 96, the discharge region 98, and the movement area 97 of the present embodiment do not move even when the table 71 rotates.

In the transport device 1 of the present embodiment, the camera 4 images the bolts 89 in the detection region 95. The position and orientation of the bolts 89 are detected from the image captured by the camera 4. The robot 2 grips the bolt 89 based on the position and orientation of the bolts 89 in the gripping region 96. Then, the robot 2 places the bolt 89 on the pallet 82 of the export device 6. It should be noted that, depending on the number of bolts 89 in the gripping region 96 or the position and orientation of the bolts 89, there are some cases where the robot 2 cannot take out the bolts 89.

Among the bolts 89 that are not taken out by the robot 2, the bolts 89 placed in the second rotation region 92 are discharged by the plate-like member 74 in the discharge region 98. The bolts 89 discharged by the plate-like member 74 are supplied to the first rotation region 91 of the table 71 by the collection device 70. Among the bolts 89 that are not taken out by the robot 2, the bolts 89 placed in the first rotation region 91 proceed to the movement region 97. Then, in the movement region 97, the bolts 89 are moved to the second rotation region 92 by the plate-like member 73.

In this way, in the transport device 1 according to the present embodiment, the bolts 89 supplied to the table 71 are configured to make a maximum of approximately two rotations. The bolts 89 that were not taken out while they were moving in the first rotation region 91 move to the second rotation region 92. Then, the bolts 89 that could not be taken out in the second rotation region 92 are collected by the collection device 70. In this way, the bolts 89 are circulated.

Figure 4:
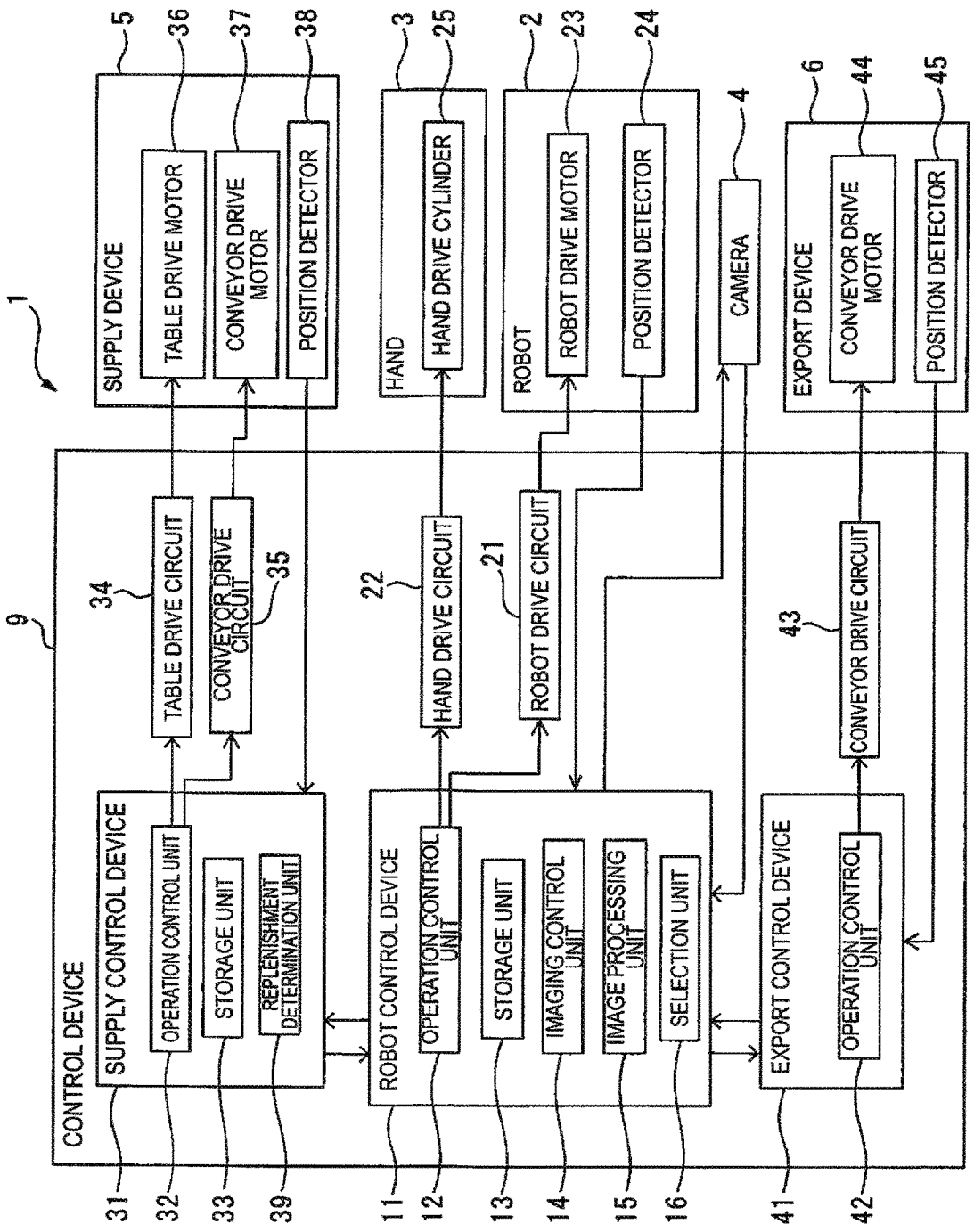
FIG. 4 is a block diagram of the transport device according to the embodiment.

FIG. 4 illustrates a block diagram of the transport device according to the present embodiment. The transport device 1 includes a control device 9. The control device 9 includes a robot control device 11 for controlling the robot 2 and the hand 3. The robot control device 11 of the present embodiment also controls the camera 4. The robot control device 11 includes an arithmetic processing device having a Central Processing Unit (CPU) as a processor, and a Random Access Memory (RAM) and a Read Only Memory (ROM) that are connected to the CPU via a bus. The arithmetic processing device according to the present embodiment is constituted by a computer.

The robot control device 11 includes a storage unit 13 for storing arbitrary information. The storage unit 13 stores information related to control of the robot 2, control of the hand 3, and control of the camera 4. For example, the storage unit 13 stores an operation programs for the robot 2, the hand 3, and the camera 4. In addition, the storage unit 13 stores information input to an operation panel that is connected to the robot control device 11.

The robot control device 11 includes an operation control unit 12 that controls the robot 2 and the hand 3. The operation control unit 12 transmits an operation command based on the operation program to a robot drive circuit 21. The robot drive circuit 21 supplies electricity based on the operation command to the robot drive motor 23 so as to drive the robot drive motor 23. The position and orientation of the robot 2 change. In addition, the operation control unit 12 transmits an operation command based on the operation program to the hand drive circuit 22. The hand drive circuit 22 operates a pump, a solenoid valve, and the like for supplying air based on the operation command. By driving a hand drive cylinder 25, the finger portions of the hand 3 are opened and closed.

The robot 2 includes a position detector 24 for detecting the position and orientation of the robot 2. The position detector 24 can be constituted by an encoder that is attached to the robot drive motor 23 and configured to detect rotation angles. The robot control device 11 receives a signal relating to the rotation angle that is output from the position detector 24. The robot control device 11 detects the position and orientation of the robot 2 based on the rotation angle.

The robot control device 11 includes an imaging control unit 14 that controls the camera 4. The imaging control unit 14 transmits an imaging command to the camera 4 based on the operation program stored in the storage unit 13. The camera 4 receives the imaging command and captures an image of the surface of the table 71 on which the bolt 89 is placed.

The robot control device 11 includes an image processing unit 15 configured to process the image captured by the camera 4. The image processing unit 15 detects the position and orientation of the bolt 89 by processing the image. For example, a reference image that serves as a reference for the bolt 89 may be stored in the storage unit 13. The image processing unit 15 can detect the position and orientation of the bolt 89 by using a pattern matching method. That is, the image processing unit 15 can detect the position and orientation of the bolt 89 by comparing the images of the bolts 89 acquired by the camera 4 with the reference image. An arbitrary position of the bolt 89 can be utilized as the position of the bolt 89. For example, the reference position of the bolt 89 can be set in the reference image.

The control device 9 includes a supply control device 31 configured to control the supply device 5. Similar to the robot control device 11, the supply control device 31 includes an arithmetic processing device having a CPU. The supply control device 31 includes a storage unit 33 that stores arbitrary information. The storage unit 33 stores information relating to control of the supply device 5. In the storage unit 33, for example, an operation program for the supply device 5 is stored.

The supply control device 31 includes an operation control unit 32 configured to control the table 71 and the conveyor 75 of the collection device 70. The operation control unit 32 transmits an operation command based on the operation program to the table drive circuit 34. The table drive circuit 34 supplies electricity to the table drive motor 36 based on the operation command. The table drive motor 36 is driven, whereby the table 71 rotates.

The supply device 5 includes a position detector 38 for detecting the rotation angle of the table 71. The position detector 38 may be attached to the table drive motor 36, for example. The position detector 38 can detect the rotation angle of the table 71 with reference to a predetermined position. The supply control device 31 can detect the rotation angle of the table 71 around the rotation axis 78 based on the output of the position detector 38. In short, the supply control device 31 can detect the phase of the table 71 at an arbitrary time.

The operation control unit 32 provides an operation command based on the operation program to the conveyor drive circuit 35. The conveyor drive circuit 35 supplies electricity to the conveyor drive motor 37 based on the operation command. By driving the conveyor drive motor 37, the bolts 89 are transported by the conveyor 75.

The control device 9 in the present embodiment includes an export control device 41 configured to control the export device 6. The export control device 41 includes an operation control unit 42 for transmitting an operation command for the export device 6 based on the operation program. The operation control unit 42 transmits an operation command to the conveyor drive circuit 43. The conveyor drive circuit 43 supplies electricity to the conveyor drive motor 44 based on the operation command. By driving the conveyor drive motor 44, the pallet 82 placed on the conveyor 81 is moved.

The export device 6 includes a position detector 45 for detecting the movement amount of the conveyor 81. The position detector 45 is attached to the conveyor drive motor 44, for example. The operation control unit 42 can calculate the movement amount of the conveyor 81 based on the output of the position detector 45. In other words, the export control device 41 can detect the movement amount of the pallet 82.

The robot control device 11 according to the present embodiment is configured to be mutually communicable with the supply control device 31. In addition, the robot control device 11 is configured so as to be mutually communicable with the export control device 41. Although the robot control device 11 directly communicates with the supply control device 31 and the export control device 41 in the present embodiment, the embodiment is not limited to this. For example, the plurality of control devices may be configured to be able to communicate via a predetermined device. Alternatively, each control device may be connected to a Programmable Logic Controller (PLC), and each control device may be driven according to the command from the PLC.

The export control device 11 can drive the export device 6 based on the number of bolts 89 that the robot 2 has moved to the pallet 82. For example, when bolts 89 are disposed in all the hole 82*a* of the pallet 82 arranged at a predetermined position, the conveyor 81 can be driven by a movement amount corresponding to one pallet.

Figure 5:
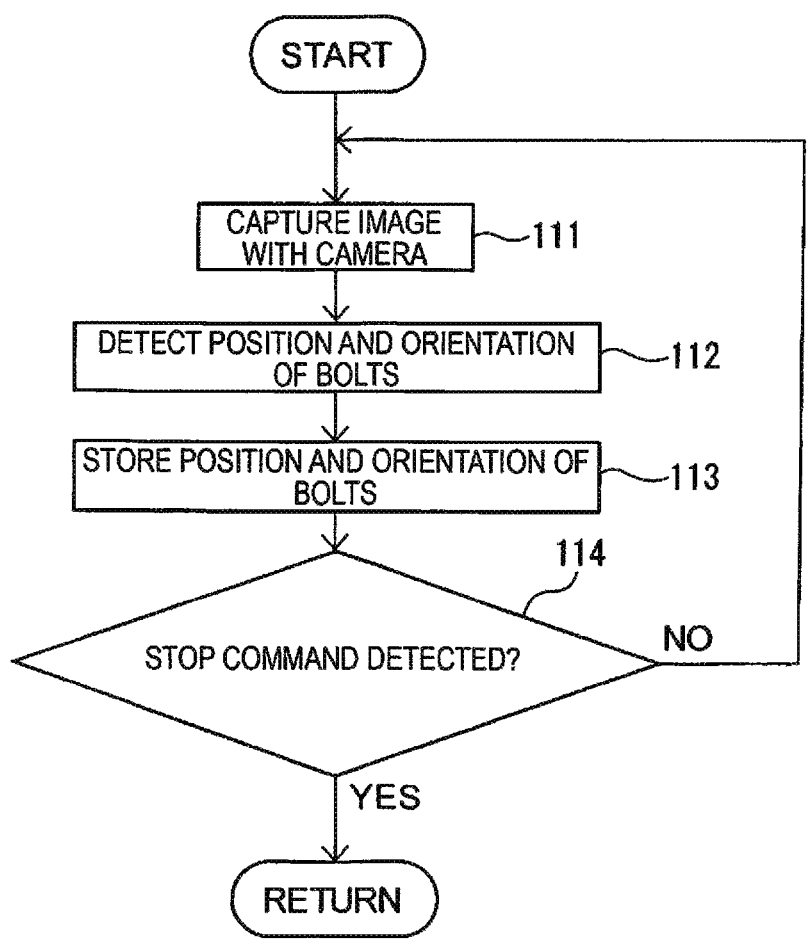
FIG. 5 is a flowchart explaining a control of an imaging device according to the embodiment.

FIG. 5 illustrates a flowchart of a control for capturing an image according to the present embodiment. With reference to FIG. 2 to FIG. 5, in step 111, the camera 4 images the detection region 95. In some cases, the image may include a bolt 89 placed on the table 71. The images captured by the camera 4 are transmitted to the image processing unit 15 of the robot control device 11.

In step 112, the image processing unit 15 detects the position and orientation of the bolts 89 in the detection region 95. The position and orientation are detected for each bolt 89. The position of the bolt 89 includes the position on the table 71. For example, the image processing unit 15 acquires the rotation angle (phase) of the table 71 from the supply control device 31. The position of a bolt 89 includes, for example, the central angle in the table 71 and the distance from the rotation axis 78 when a predetermined position of the table 71 is used as a reference. In addition, the image processing unit 15 can determine the rotation region where the bolt 89 is disposed based on the position of the bolt 89. The orientation of a bolt 89 includes the direction in which the bolt 89 faces.

In step 113, the storage unit 13 stores information on the bolts including the position and orientation of the bolts 89 and the rotation region where the bolts 89 are disposed. The information on the bolts is generated for each respective bolt and stored in the storage unit 13.

In step 114, it is determined whether or not a command to stop the transport device 1 has been input. When a stop command is not detected, the control returns to step 111. Then, in step the camera 4 captures an image. In this way, it is possible to repeat the image capture. The imaging control unit 14 can transmit the imaging command at predetermined time intervals. Alternatively, the camera 4 can capture an image each time the table 71 rotates by a predetermined rotation angle. It is preferable that the camera 4 captures images at short intervals such that there are no parts of the table 71 that are not imaged. Also, in step 112 and step 113, the robot control device 11 stores bolt information including the position and orientation of the bolts 89 in the detection region 95. In this way, the robot control device 11 detects the positions and orientations for all the bolts 89 supplied to the gripping region 96, and stores them in the storage unit 13.

In step 114, when the robot control device 11 detects the stop command for the transport device 1, this control is terminated.

Figure 6:
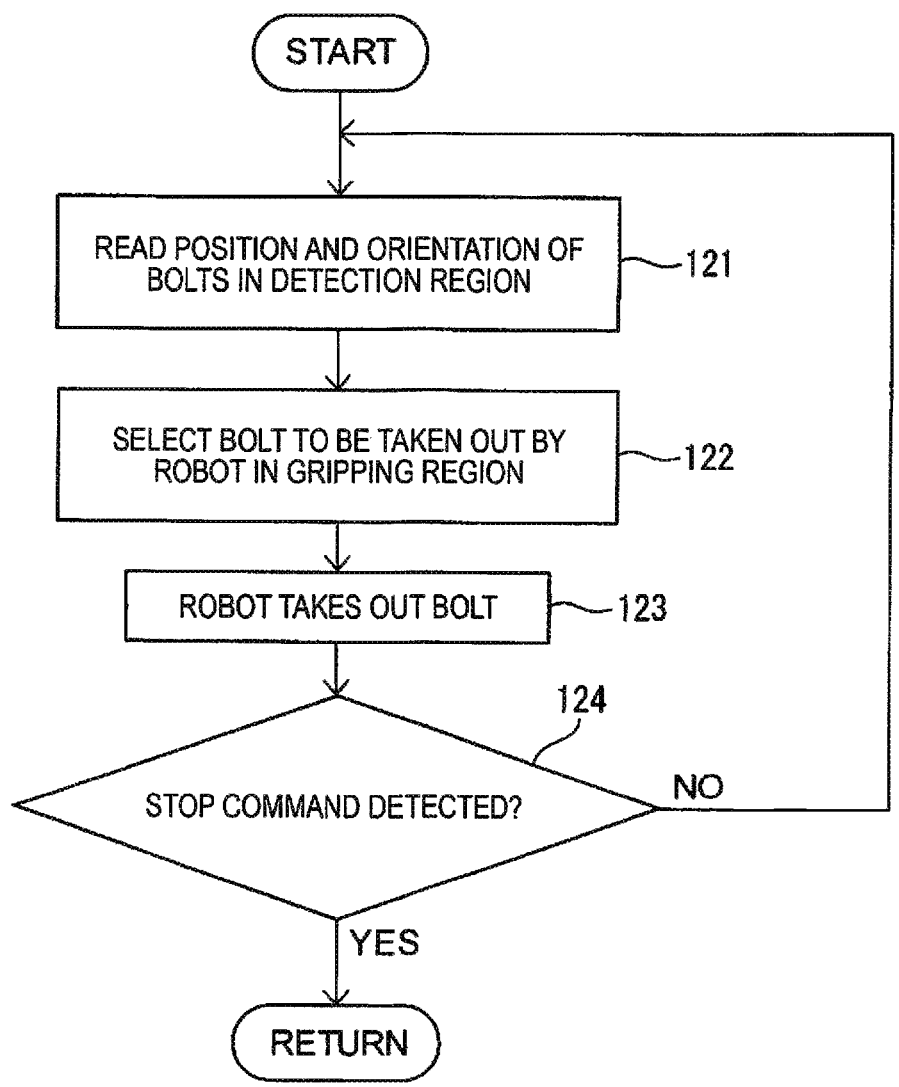
FIG. 6 is a flowchart explaining a control of a robot according to the embodiment.

FIG. 6 illustrates a flowchart of the control for the robot according to the present embodiment. With reference to FIG. 2 to FIG. 4 and FIG. 6, the robot control device 11 includes a selection unit 16 configured to select the bolt 89 that the robot 2 takes out in the gripping region 96. In step 121, the selection unit 16 reads the information on the bolts from the storage unit 13. The selection unit 16 reads the position and orientation of the bolts 89 detected by the image processing unit 15 in the detection region 95.

In step 122, the selection unit 16 acquires the current rotation angle (phase) of the table 71 from the supply control device 31. The selection unit 16 detects all the bolts 89 that are currently disposed in the gripping region 96 based on the rotation angle of the table 71.

In the present embodiment, the selection unit 16 sequentially selects the bolts 89 in the order closest to the discharge region 98 from among the bolts 89 disposed in the gripping region 96. The selection unit 16 preferentially selects the bolts 89 disposed in the second rotation region 92 over the bolts 89 disposed in the first rotation region 91. Further, the selection 16 may select a bolt 89 disposed on the furthest downstream side in the gripping region 96.

Next, the selection unit 16 calculates the position and orientation of the selected bolt 89 based on the current rotation angle of the table 71. The selection unit 16 determines whether or not the selected bolt 89 can be taken out.

For example, with reference to FIG. 3, the selection unit 16 determines that it is impossible to take out a bolt 89*a* standing vertically with its head on the bottom side. In addition, the selection unit 16 determines that it is impossible to take out bolts 89*b* and 89*c* which are in condition that a plurality of bolts are in contact. Alternatively, when a plurality of bolts 89 are overlapping, the selection unit 16 determines that a take-out action cannot be performed.

When a plurality of bolts 89 come in contact with each other or a plurality of bolts 89 are overlapping, there are cases in which another bolt 89 is moved after taking out one bolt 89. Since the position and orientation of the other bolt 89 change, the other bolt 89 cannot be taken out. Alternatively, there are cases where the other bolt 89 may contact a nearby bolt and move it. For this reason, in the present embodiment, when a plurality of the bolts 89 come in contact with each other or a plurality of bolts 99 overlap, the selection unit 16 determines that it is impossible to take out the bolt 89.

Alternatively, there is a case where the front side and the back side of the workpiece is defined. When the workpiece whose front side is oriented upward is taken out, the selection unit 16 determines that it is impossible to take out the workpiece whose back side is oriented upward.

With reference to FIG. 2 to FIG. 4 and FIG. 6, when it is impossible to take out the bolt 89 disposed on the furthest downstream side in the second rotation region 92 within the gripping region 96, the selection unit 16 selects a next bolt 89 that is secondly closest to the discharge region 98 and determines whether or not the take-out operation is possible. In this way, the selection unit 16 sequentially performs determination starting from the bolts 89 close to the discharge region 98. By adopting this control, the number of bolts 89 discharged from the table 71 can be reduced. It is possible to prevent the bolts 89 from being damaged or lost when they are collected by the collection device 70. As a result, it is possible to reduce the occurrence rate of product defects.

In addition, when the bolt 89 is not disposed in the second rotation region 92 in the gripping region 96, the selection unit 16 can select the bolt 89 disposed in the first rotation region 91. It should be noted that the bolt 89 that are disposed straddling the boundary line 90 may be determined to belong to either one of the first rotation region 91 or the second rotation region 92. For example, the selection unit 16 can determine that bolts 89 that are disposed straddling the boundary line 90 are disposed in the first rotation region 91.

It should be noted that the control of the selection unit 16 is not limited to this embodiment, and any bolt 89 disposed in the gripping region 96 can be selected. For example, the selection unit 16 may select the workpiece disposed at a position such that the movement amount of the robot will be minimal from the current position of the robot.

When the bolt 89 to be taken out is selected by the selection unit 16, the control proceeds to step 123. In step 123, the selection unit 16 transmits the command to the operation control unit 12 so as to take out the selected bolt 89. The operation control unit 12 drives the hand 3 and the robot 2 to take out the selected bolt 89. Then, the robot 2 takes out the bolt 89 and transports it to the pallet 82. It should be noted that the rotation of the table 71 may be temporarily stopped while the robot 2 takes out the bolt 89 from the table 71.

Next, in step 124, the robot control device 11 determines whether or not the stop command for the transport device 1 has been input. When the stop command is detected in step 124, this control is terminated. When the stop command is not detected, the control proceeds to step 121. Then, by executing the control from step 121 to step 123, the next bolt 89 is taken out.

Figure 7:
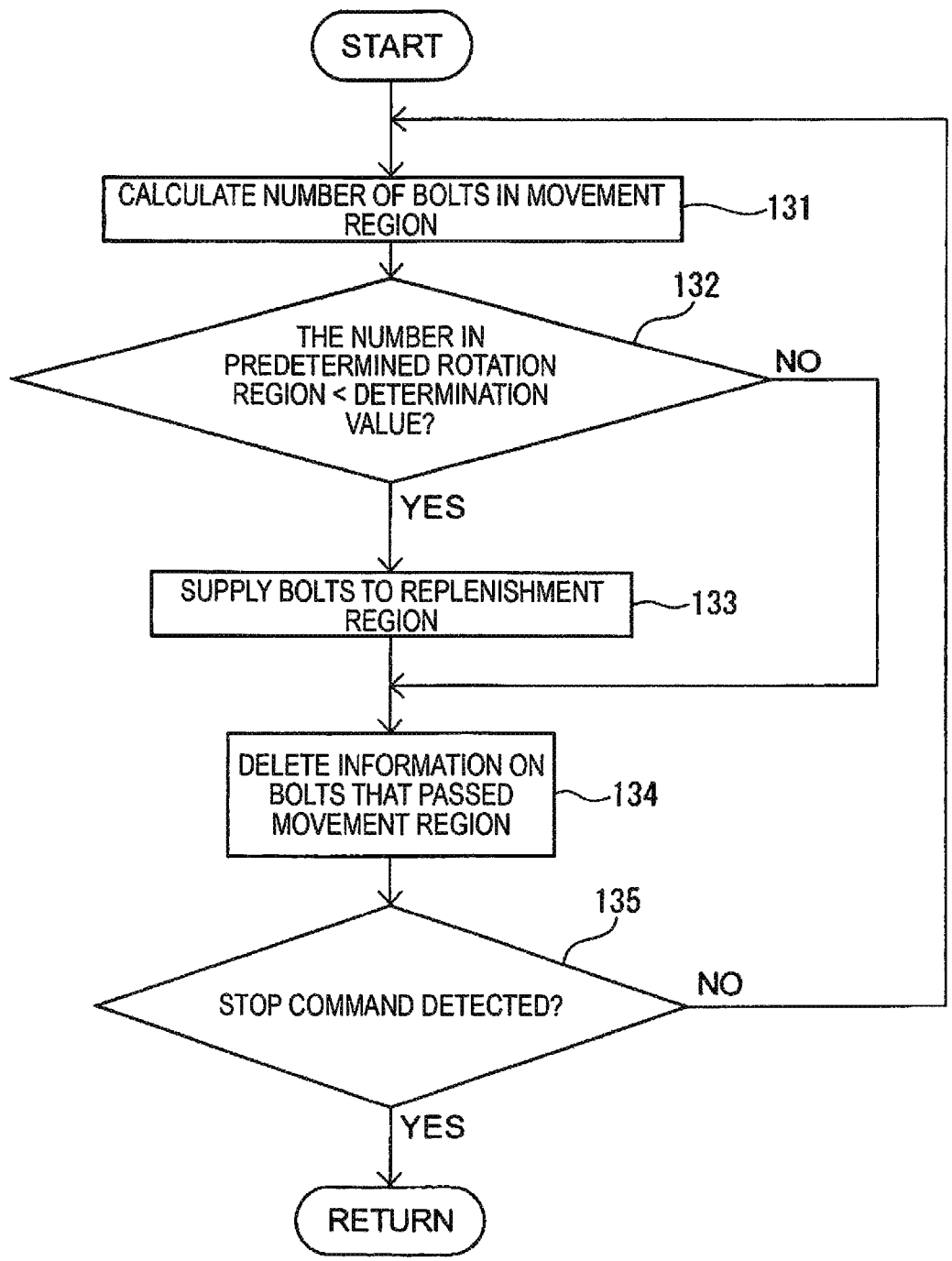
FIG. 7 is a flowchart explaining a control of the collection device according to the embodiment.

FIG. 7 illustrates a flowchart of the control of the collection device according to the present embodiment. The supply control device 31 controls the timing of replenishing the bolts 89 collected by the collection device 70 and the newly added bolts 89 to the table 71.

With reference to FIG. 3, the bolts 89 disposed in the first rotation region 91 among the bolts 89 that are not gripped in the gripping region 96 are moved to the movement region 97. Then, the bolts 89 are moved to the second rotation region 92 by the plate-like member 73. The collection device 70 collects the bolts 89 disposed in the second rotation region 92 among the bolts 89 that are not gripped in the gripping region 96.

With reference to FIG. 3, FIG. 4, and FIG. 7, the supply control device 31 includes a replenishment determination unit 39 that determines whether or not the bolts 89 are replenished to the table 71. In step 131, the replenishment determination unit 39 calculates the number of bolts 89 disposed in the movement region 97. For example, the replenishment determination unit 39 can delete the information on the bolts 89 taken out by the robot 2 and the information on the bolts 89 collected by the collection device 70 from the information of the bolts 89 detected in the detection region 95. The replenishment determination unit 39 can calculate the number of bolts 89 each time the table 71 rotates by a predetermined rotation angle.

The replenishment determination unit 39 can calculate the number of bolts 89 disposed in a predetermined rotation region in the movement region 97. Here, the replenishment determination unit 39 calculates the number of bolts 89 disposed in the first rotation region 91 and the second rotation region 92. The replenishment determination unit 39 calculates the number of all the bolts 89 disposed in the movement region 97. Alternatively, the replenishment determination unit 39 may calculate the number of bolts 89 that move from the first rotation region 91 to the second rotation region 92.

Next, in step 132, the replenishment determination unit 39 determines whether or not the number in the predetermined rotation region is less than a predetermined determination value. The determination value is stored in the storage unit 33. In the present embodiment, the replenishment determination unit 39 determines whether or not the number of bolts 89 in the movement region 97 is less than the determination value. In step 132, when the number of bolts 89 in the predetermined rotation region is greater than or equal to the determination value, the control proceeds to step 134. In contrast, in step 132, when the number of bolts 89 in the predetermined rotation region is less than the determination value, the control proceeds to step 133.

In step 133, control is performed so as to replenish the bolts 89 to the replenishment region 94. The replenishment determination unit 39 replenishes the bolts 89 to the region in which the number of bolts 89 was determined to be few. The replenishment determination unit 39 transmits the command to the operation control unit 32 to drive the conveyor 75. The operation control unit 32 drives the conveyor drive motor 37, whereby the bolts 89 are replenished to the first rotation region 91. The operation control unit 32 can drive the conveyor 75 at a predetermined driving speed and driving time. Alternatively, the operation control unit 32 may drive the conveyor 75 so as to increase the number of bolts 89 to be replenished in accordance with a decrease in the number of bolts 89 in the predetermined rotation regions.

In the present embodiment, the bolts 89 can be supplied to the first rotation region 91 that corresponds to a part where the number of bolts 89 is few in the second rotation region 92. For this reason, it is possible to avoid a situation where the number of bolts 89 are reduced in both the first rotation region 91 and the second rotation region 92 in the gripping region 96. It is possible to suppress the robot 2 from stopping since there are no bolts 89 to be taken out by the robot 2. Alternatively, when there are too many bolts 89 replenished to the table 71, the robot 2 may not be able to take out the bolt 89. As a result, a large number of bolts 89 may be discharged. By performing control of the collection device 70 as described above, it is possible to suppress the number of bolts 89 collected by the collection device 70.

It should be noted that the control of the collection device 70 is not limited to the above-described embodiment, and any control for replenishing the bolts can be performed. For example, the supply control device 31 may perform a control for replenishing the bolts 89 at predetermined time intervals.

Next, in step 134, the supply control device 31 deletes, from the storage unit 33, the information on the bolts 89 used for determining replenishment of the bolts 89. The supply control device 31 deletes the information on the bolts 89 that have passed through the movement region 97. In addition, in the robot control device 11 as well, the information on the bolts 89 that have passed through the movement region 97 is deleted from the storage unit 13.

Next, in step 135, the supply control device 31 determines whether or not a stop command for the transport device 1 has been detected. When the stop command has not been detected, the control proceeds to step 131. Then, from step 131 to step 134, the control for replenishing the bolts 89 is repeated. When the stop command is detected in step 135, this control is terminated.

In the supply device of the present embodiment, workpieces are rotated on the table a plurality of times before the workpieces are discharged from the table. For this reason, the opportunities to be taken out by the robot increase, and it is possible to efficiently supply workpieces to the robot. In addition, the workpieces move sequentially from the rotation region to be replenished to the rotation region to be discharged. For this reason, the workpieces are distributed on the table, and workpieces can be efficiently supplied to the robot. It is possible to suppress occurrence of the region having high density and the region having low density on the table. In other words, it is possible to effectively utilize the entire surface of the table. In this way, the supply device of the present embodiment can efficiently supply workpieces to a take-out device.

In the present embodiment, the plate like member 73 that does not move is utilized as the movement member for moving the bolts 89. By adopting this configuration, the configuration of the movement member can be simplified. In addition, the plate-like member 73 can reliably move the bolts 89 to the adjacent rotation region.

It should be noted that the movement member is not limited to a stationary plate-like member. Any arbitrary member that is configured to move workpieces to the adjacent rotation region can be utilized as the movement member. For example, a nozzle that ejects air may be disposed as the movement member. That is, the nozzle may move workpieces by ejecting air directed toward the workpieces. Alternatively, the movement member may be configured to move by a device such as a robot.

In the supply device 5 according to the present embodiment, the replenishment region 94 is set in the innermost first rotation region 91, and the discharge region 98 is set in the outermost second rotation region 92. The movement member may be configured to move the bolts 89 from one rotation region to another rotation region arranged outside the one rotation region. The supply device 5 may be configured to sequentially move workpieces from the inner rotation region to the outer rotation region.

By adopting this configuration, the intervals between the bolts 89 can be increased when the bolts 89 are moved. Since the turning radii of the bolts 89 disposed in the second rotation region 92 are larger than the turning radii of the bolts 89 disposed in the first rotation region 91, the movement speed of the bolts 89 increases. For this reason, the interval between the bolts 89 may increase as they move further to the outer rotation region. As the robot 2 can easily take out the bolts 89, a large number of bolts 89 can be taken out. As a result, the number of bolts 89 collected by the collection device 70 can be reduced.

Figure 8:
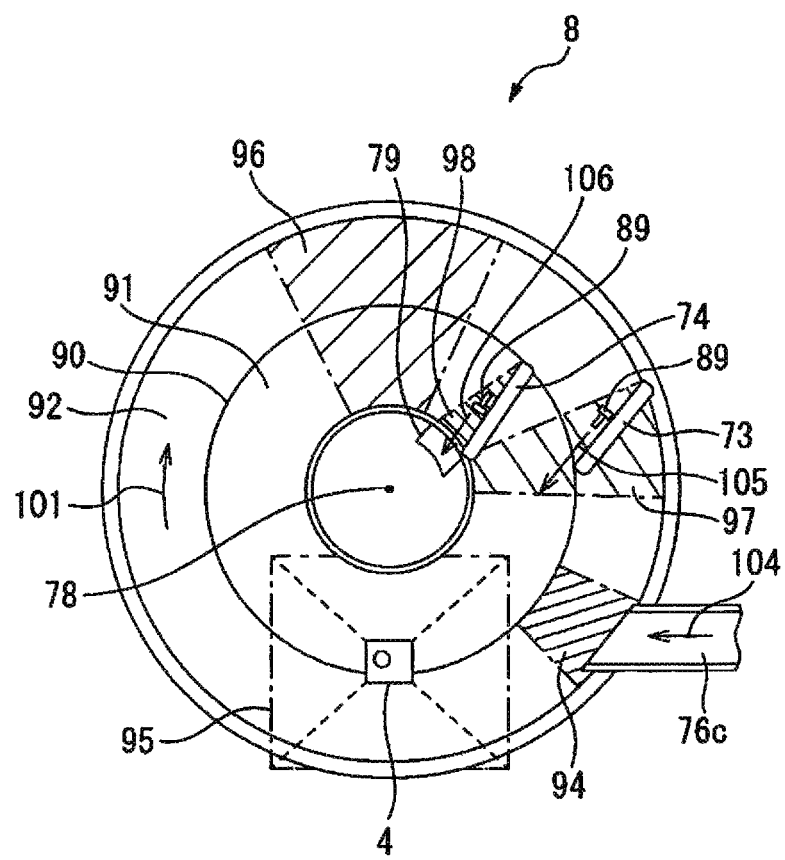
FIG. 8 is a plan view of the supply device of first modified example according to the embodiment.

FIG. 8 illustrates an enlarged plan view of a supply device of first modified example according to the present embodiment. The supply device 8 of the first modified example is configured such that the bolts 89 move sequentially from the outer rotation region to the inner rotation region. In this case, the replenishment region 91 is set in the outermost second rotation region 92, and the discharge region 98 is set in the innermost first rotation region 91. The plate member 74 that serves as the discharge member is disposed in the first rotation region 91. As indicated by the arrow 106, the bolts 89 are discharged from the discharge port 79 and collected by a collection device.

The plate-like member 73 that serves as the movement member is configured to move workpieces from one rotation region to a rotation region arranged inside the one rotation region. In the supply device 8 of the first modified example, it is preferable that the robot preferentially takes out the bolts 89 disposed in the inner rotation region in the gripping region 96.

In this way, in the supply device, it is possible to set a replenishment region which is replenished with workpieces in one rotation region of the innermost rotation region and the outermost rotation region. Then, it is possible to set the discharge region where the discharge member is disposed in the other rotation region.

Figure 9:
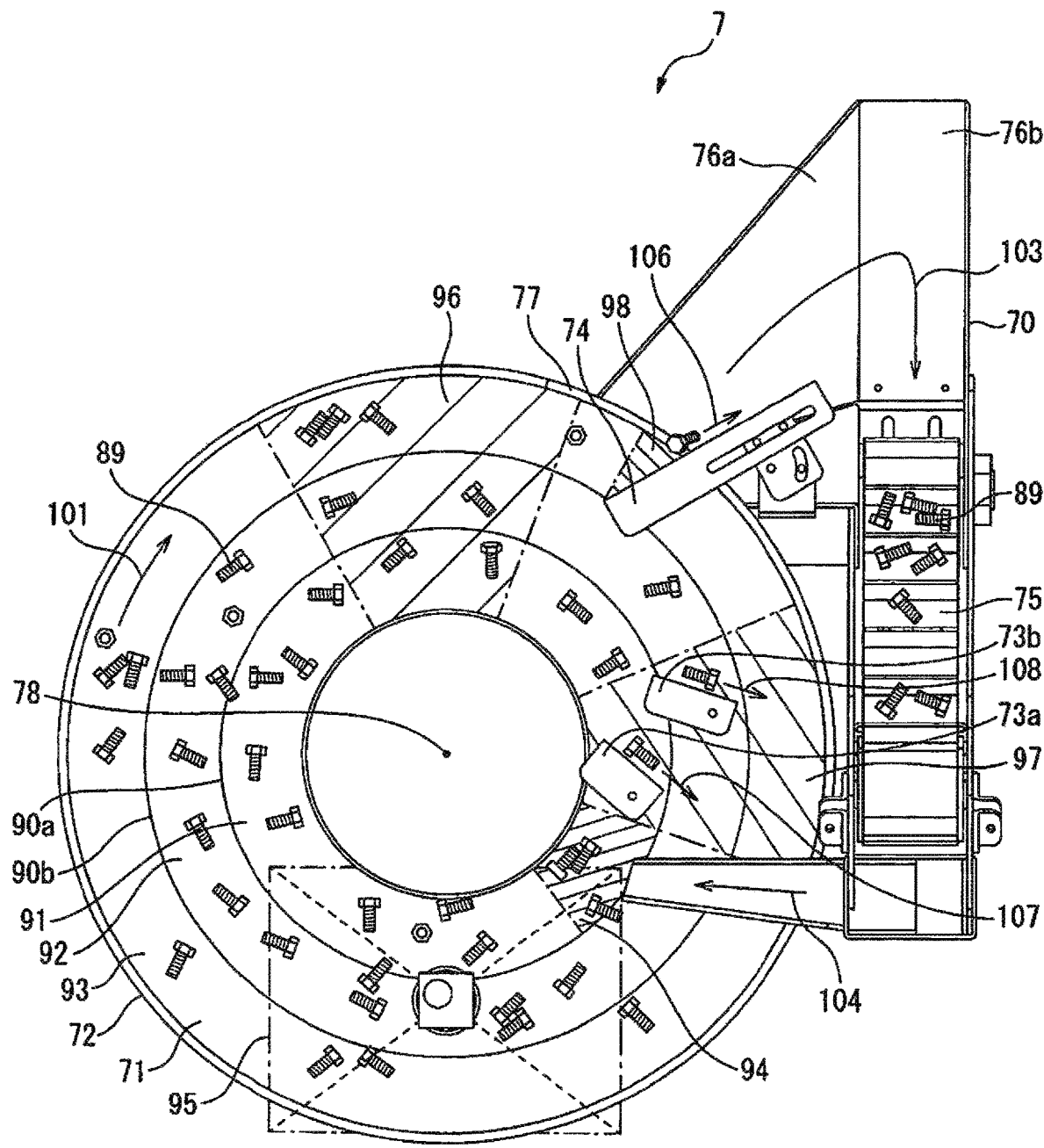
FIG. 9 is an enlarged plan view of a supply device of second modified example according to the embodiment.

FIG. 9 illustrates an enlarged plan view of a supply device of second modified example according to the present embodiment. Although two rotation regions are set in the above described supply device 5, the embodiment is not limited to this. Three or more rotation regions may be set in the table of the supply device. Three rotation regions are defined by the boundary lines 90a and 90b in the supply device 7 of the second modified example. A first rotation region 91, a second rotation region 92, and a third rotation region 93 are set in the supply device 7. The plate-like member 71 that serves as the discharge member is disposed so as to guide the bolts 89 circulating around the third rotation region 93 to the collection device 70. The collection device 70 replenishes the bolts 89 to the replenishment region 94 set in the first rotation region 91. In the movement region 97, plate-like members 73a and 73b are disposed as movement members. The plate-like member 73a is disposed in the first rotation region 91. The plate-like member 73b is disposed in the second rotation region 92. The plate-like members 73a and 73b are supported by a support member (not illustrated in the Figures) so as not to move.

As illustrated by the arrow 107, the plate-like member 73a moves the bolts 89 circulating in the first rotation region 91 to the second rotation region 92. As illustrated by the arrow 108, the plate-like member 73b moves the bolts 89 circulating in the second rotation region 92 to the third rotation region 93.

The selection unit 16 of the robot control device 11 can preferentially select a bolt 89 disposed in the third rotation region 93 in the gripping region 96. When the bolt 89 is not disposed in the third rotation region 93, the selection unit 16 can select the bolt 89 disposed in the second rotation region 92. Further, when the bolt 89 is not disposed in the second rotation region 92, the selection unit 16 can select the bolt 89 arranged in the first rotation region 91.

When the number of bolts 89 that are moved to the second rotation region 92 and the third rotation region 93 are less than a predetermined determination value in the movement region 97, for example, the collection device 70 can replenish the bolts 89 to the first rotation region 91. In other words, when the number of bolts 89 disposed in a rotation region other than the first rotation region 91 are few, the bolts 89 can be replenished to the first rotation region 91.

In this way, when three or more rotation regions are set, the supply device can circulate workpieces while sequentially moving them in the rotation regions. Then, the robot can take out workpieces in the gripping region.

Although the control device 9 of the present embodiment includes a supply control device 31 for controlling the supply device 5, a robot control device 11 for controlting the hand 3 and the robot 2, and an export control device 41 for controlling the export device 6, the embodiment is not limited to this. The control devices can be configured to control any device. For example, the robot control device may be configured to control the supply device. Alternatively, a control device that performs camera control and image processing may be provided separately from the robot control device.

Although a bolt 89 is exemplified as a workpiece in the present embodiment, the embodiment is not limited to this. Any member can be used as a workpiece. For example, it is possible to adopt, as workpieces, fastening members such as screws, electronic parts to be mounted on a substrate, parts such as cases, and finished products.

In the present embodiment, although the workpieces taken out by the take-out device are exported by the export device, the embodiment is not limited to this. The take-out device can perform any manner of tasks by using the workpieces taken out from the supply device. For example, the robot can judge the type of parts based on images of the workpieces, and transport parts to a predetermined location for each type of part. In short, the robot can divide the parts into predetermined types. Alternatively, the take-out device can attach the workpiece to a predetermined member. For example, when an electronic component is utilized as the workpiece, the robot can attach the electronic component to the surface of substrate moved by the conveyor.

Although the take-out device of this embodiment is a robot having the parallel link mechanism, the embodiment is not limited to this. Any device that can take out workpieces from the supply device can be employed as the take-out device. For example, a robot having a vertical multi-joint mechanism can be utilized as the take-out device. This robot may include, for example, a swivel base, a lower arm, an upper arm, and a wrist portion. Joints may be disposed between the swivel base and the lower arm, and also between the lower arm and the upper arm. A robot drive motor may be disposed in the joint. By driving the robot drive motor, the position and orientation of the robot change. Alternatively, a dedicated device or the like having a linear motion mechanism for taking out the workpiece can be utilized as the take-out device.

According to the aspects of the present disclosure, it is possible to provide a supply device and a transport device, which efficiently supply the workpiece to a take-out device.

In each control described above, the sequence of steps may be changed as appropriate, within such a range that the functionality and operation are not changed. The above-described embodiments can be combined as appropriate.

Identical or equivalent parts are given identical reference numerals in each of the above-described drawings. Note that the above-described embodiments are merely examples and are not intended to limit the invention. Changes to the embodiments as indicated in the claims are included in the embodiments.

The invention claimed is:
1. A transport device comprising:
a supply device including a placement member on which a workpiece is placed and supplying the workpiece to a take-out device taking out the workpiece;
a take-out device taking out the workpiece placed on the placement member;
an imaging device imaging the workpiece placed on the placement member; and
a control device controlling the take-out device and the imaging device; wherein the supply device includes:
a drive motor rotating the placement member;
a movement member moving the workpiece placed on the placement member; and
a discharge member discharging the workpiece to the outside of the placement member; wherein
a plurality of rotation regions are predetermined on a surface of the placement member in a concentric shape around a rotation axis of the placement member,
the rotation regions are regions in which the workpiece is moved in the circumferential direction by rotation of the placement member, a replenishment region in which the workpiece is replenished is set in one rotation region of an innermost rotation region and an outermost rotation region, and a discharge region in which the discharge member is disposed is set in the other rotation region,
the movement member is configured to move the workpiece to an adjacent rotation region in a direction from the rotation region in which the replenishment region is set to the rotation region in which the discharge region is set,
a detection region in which the workpiece is imaged by the imaging device, a gripping region in which the workpiece is gripped by the take-out device, and a movement region in which the movement member is disposed are predetermined in a region where the placement member is disposed,
at least a portion of the detection region is disposed downstream from the replenishment region in a direction in which the placement member rotates, and the detection region is disposed upstream from the gripping region,
the gripping region, the discharge region, the movement region, and the replenishment region are disposed in the order of the gripping region, the discharge region, the movement region, and the replenishment region along the direction of rotation of the placement member when the placement member is viewed in a plan view, and
the control device detects a position and orientation of the workpiece based on an image of the workpiece captured by the imaging device, calculates a position and orientation of the workpiece in the gripping region based on a position and orientation of the workpiece in the detection region and a rotation angle of the placement member, and controls the take-out device based on a position and orientation of the workpiece in the gripping region so as to grip the workpiece when the workpiece passes through the gripping area a plurality of times while moving through the rotation regions.

2. The transport device according to claim 1, wherein the movement member includes a plate-like member that does not move when the placement member rotates, and
the plate-like member is inclined with respect to a radial direction of the placement member when viewed in a plan view so as to move the workpiece placed on one rotation region to the adjacent rotation region.

3. The transport device according to claim 1, wherein the replenishment region is defined in the innermost rotation region,
the discharge region is defined in the outermost rotation region, and
the movement member is configured to move the workpiece from one rotation region toward another rotation region arranged outside the one rotation region.

4. The transport device according to claim 3, wherein the supply device includes a collection device collecting the workpiece discharged outside of the placement member,
the discharge member is configured to move the workpiece from the outermost rotation region to the outside of the placement member, and
the collection device includes a collection part collecting the workpiece discharged from the placement member, a conveyor transporting the workpiece collected by the collection part, and a replenishment part replenishing the workpiece to the innermost rotation region.

5. The transport device according to claim 1, further comprising an export device exporting the workpiece taken out by the take-out device, wherein the control device controls the take-out device so as to change a state of the workpiece taken out from the placement member to a predetermined direction and orientation and transport the workpiece to the export device.

* * * * *